US011094005B2

(12) United States Patent
Secrist et al.

(10) Patent No.: US 11,094,005 B2
(45) Date of Patent: *Aug. 17, 2021

(54) SYSTEM AND METHOD FOR DETERMINING SOCIAL STATEMENTS

(71) Applicant: Capital One Services, LLC, McLean, VA (US)

(72) Inventors: Ronald A. Secrist, Falls Church, VA (US); Vijay Konduru, Glen Allen, VA (US); Gautam Chatur, Laurel, MD (US); William Bogey, Arlington, VA (US); Tammy Eisele, Mechanicsville, VA (US); Matthew A. Smith, Plano, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 51 days.

This patent is subject to a terminal disclaimer.

(21) Appl. No.: 16/571,733

(22) Filed: Sep. 16, 2019

(65) Prior Publication Data

US 2020/0013115 A1    Jan. 9, 2020

Related U.S. Application Data

(63) Continuation of application No. 14/031,263, filed on Sep. 19, 2013, now Pat. No. 10,417,701.

(60) Provisional application No. 61/703,072, filed on Sep. 19, 2012.

(51) Int. Cl.
*G06Q 40/00* (2012.01)

(52) U.S. Cl.
CPC .................. *G06Q 40/00* (2013.01)

(58) Field of Classification Search
None
See application file for complete search history.

(56) References Cited

U.S. PATENT DOCUMENTS

| 8,135,624 | B1 * | 3/2012 | Ramalingam | G06Q 30/0256 |
| | | | | 705/26.1 |
| 8,150,844 | B2 * | 4/2012 | Redstone | H04L 67/18 |
| | | | | 707/724 |
| 9,324,114 | B2 * | 4/2016 | Votaw | G06Q 40/12 |
| 2003/0220835 | A1 * | 11/2003 | Barnes, Jr. | H04M 1/724 |
| | | | | 705/14.36 |

(Continued)

*Primary Examiner* — Christopher Bridges
(74) *Attorney, Agent, or Firm* — Troutman Pepper Hamilton Sanders LLP; Christopher J. Forstner; John A. Morrissett

(57) ABSTRACT

Systems and methods are disclosed for providing a social statement for an account holder of a financial institution. In one example embodiment, the method includes receiving, by one or more computer processors, account holder financial data associated with the account holder, and receiving, by the one or more computer processors, account holder social data associated with one or more social networking profiles of the account holder. The method further includes associating, by the one or more computer processors, the account holder social data with the account holder financial data. In addition, the method includes identifying peer financial data associated with a peer group, and creating a social statement based at least in part on the account holder financial data, the account holder social data, and the peer financial data. Further, the method includes providing the social statement to the account holder.

20 Claims, 8 Drawing Sheets

(56) References Cited

U.S. PATENT DOCUMENTS

| | | | |
|---|---|---|---|
| 2005/0216337 A1* | 9/2005 | Roberts | G06Q 30/0267 705/14.58 |
| 2009/0132365 A1* | 5/2009 | Gruenhagen | G06Q 30/0273 705/14.69 |
| 2009/0182664 A1* | 7/2009 | Trombley | G06Q 10/10 705/42 |
| 2010/0250359 A1* | 9/2010 | Gillenson | G06Q 30/0216 705/14.25 |
| 2010/0256982 A1* | 10/2010 | Bhagchandani | G06Q 30/04 705/1.1 |
| 2010/0274625 A1* | 10/2010 | Carlson | G06Q 30/00 705/14.3 |
| 2010/0306099 A1* | 12/2010 | Hirson | G06Q 20/382 705/38 |
| 2011/0087547 A1* | 4/2011 | Amaro | G06Q 30/02 705/14.53 |
| 2011/0161191 A1* | 6/2011 | Shen | G06Q 30/0601 705/26.1 |
| 2011/0179064 A1* | 7/2011 | Russo | H04L 67/28 707/769 |
| 2011/0196926 A1* | 8/2011 | Crawford | H04W 4/029 709/204 |
| 2011/0238474 A1* | 9/2011 | Carr | G06Q 20/10 705/14.23 |
| 2012/0101881 A1 | 4/2012 | Taylor et al. | |
| 2012/0109749 A1* | 5/2012 | Subramanian | G06Q 30/0255 705/14.53 |
| 2012/0130863 A1* | 5/2012 | Tedjamulia | G06Q 30/0224 705/27.1 |
| 2012/0296724 A1* | 11/2012 | Faro | G06Q 30/00 705/14.27 |
| 2013/0211913 A1* | 8/2013 | Ross | G06Q 40/025 705/14.53 |
| 2013/0304576 A1* | 11/2013 | Berland | G06Q 50/01 705/14.53 |
| 2014/0058796 A1 | 2/2014 | Getchius | |
| 2014/0222636 A1* | 8/2014 | Cheng | G06Q 50/01 705/35 |

* cited by examiner

SYSTEM AND METHOD FOR DETERMINING SOCIAL STATEMENTS

CROSS REFERENCE TO RELATED APPLICATIONS AND PRIORITY CLAIM

This application is a continuation of, and claims priority under 35 U.S.C. § 120 to, U.S. patent application Ser. No. 14/031,263, filed Sep. 19, 2013, which claims priority to U.S. Provisional Application No. 61/703,072, filed Sep. 19, 2012, the contents of both of which are incorporated herein by reference in their entireties.

TECHNICAL FIELD

The present disclosure relates to systems and methods for providing statements to an account holder and, more particularly to systems and methods for providing social statements to an account holder of an account at a financial institution.

BACKGROUND

Financial institutions provide account holders or potential account holders with balance information using a traditional balance statement that is typically either mailed to the account holders or made available to account holders via an online location. These traditional balance statements do not include anonymized, aggregated financial information. Thus, an account holder who has a profile on a social networking site does not have access to aggregated financial information that can allow their financial transactions to be compared to transactions of other members of their social network. Furthermore, an account holder does not have a way to record key purchase transactions and events on his or her social networks.

The disclosed embodiments are directed to overcoming one or more of the problems set forth above.

SUMMARY

In an example embodiment, the present disclosure is directed to a computer-implemented method for providing a social statement for an account holder of a financial institution, comprising: receiving, by one or more computer processors, account holder financial data associated with the account holder; receiving, by the one or more computer processors, account holder social data associated with one or more social networking profiles of the account holder; associating, by the one or more computer processors, the account holder social data with the account holder financial data; identifying peer financial data associated with a peer group; creating a social statement based at least in part on the account holder financial data, the account holder social data, and the peer financial data; and providing the social statement to the account holder.

In an example embodiment, the present disclosure is directed to a system for providing a social statement to an account holder at a financial institution, comprising: at least one memory configured to store data and instructions; and at least one processor configured to access the at least one memory and execute the instructions, causing the at least one processor to: receive account holder financial data associated with the account holder; receive account holder social data associated with one or more social networking profiles of the account holder; associate the account holder social data with the account holder financial data; identify peer financial data associated with a peer group; create a social statement based at least in part on the account holder financial data, the account holder social data, and the peer financial data; and provide the social statement to the account holder.

According to various embodiments, the system and method include wherein the identifying the peer financial data further comprises determining one or more peer criteria based on the account holder social data associated with the one or more social networking profiles of the account holder; and identifying the peer group based on the determined one or more peer criteria.

In some aspects, the system and method include wherein the peer criteria further comprises one or more of geographic area, common interests, or shared social connections.

In some aspects, the system and method further include accessing financial data associated with each member of the peer group; and aggregating the financial data of each member of the peer group to obtain the peer financial data.

In some aspects, the system and method include wherein the providing the social statement to the account holder includes displaying the social statement on a display of a computing device operated by the account holder.

In some aspects, the system and method include wherein the displaying the social statement includes displaying the social statement on the display of the computing device, wherein the social statement includes a representation of the peer financial data.

In another example embodiment, the present disclosure is directed to a method for notifying an account holder of a vendor, comprising: receiving, by one or more computer processors, account holder financial data associated with the account holder, account holder social data associated with one or more social networking profiles of the account holder, and peer financial data associated with a peer group; receiving, by the one or more computer processors, a current location of an account holder; selecting one or more vendors based on the current location of the account holder and one or more of the account holder financial data, the account holder social data, and the peer financial data; and providing a notification to the account holder that at least one of the one or more vendors is within a predefined proximity to the current location of the account holder.

In an example embodiment, a system for notifying an account holder of a vendor, comprises: at least one memory configured to store data and instructions; and at least one processor configured to access the at least one memory and execute the instructions, causing the at least one processor to: receive account holder financial data associated with the account holder, account holder social data associated with one or more social networking profiles of the account holder, and peer financial data associated with a peer group; receive a current location of an account holder; select one or more vendors based on the current location of the account holder and one or more of the account holder financial data, the account holder social data, and the peer financial data; and provide a notification to the account holder that at least one of the one or more vendors is within a predefined proximity to the current location of the account holder.

In some aspects, the system and method include wherein the selecting the one or more vendors includes: determining a location associated with each of a plurality of vendors, wherein the plurality of vendors includes the one or more vendors; and determining that the one or more vendors are within the predefined proximity to the current location of the account holder.

In some aspects, the system and method include wherein the determining that the one or more vendors are within the predefined proximity to the current location of the account holder includes: comparing the current location of the account holder to a location of each of the one or more vendors.

In some aspects, the system and method include wherein the proximity is a by the set by the account holder.

BRIEF DESCRIPTION OF THE DRAWINGS

Various embodiments of the present disclosure, together with further objects and advantages, may best be understood by reference to the following description taken in conjunction with the accompanying drawings, in the several Figures of which like reference numerals identify like elements, and in which.

DETAILED DESCRIPTION

Figure 1:
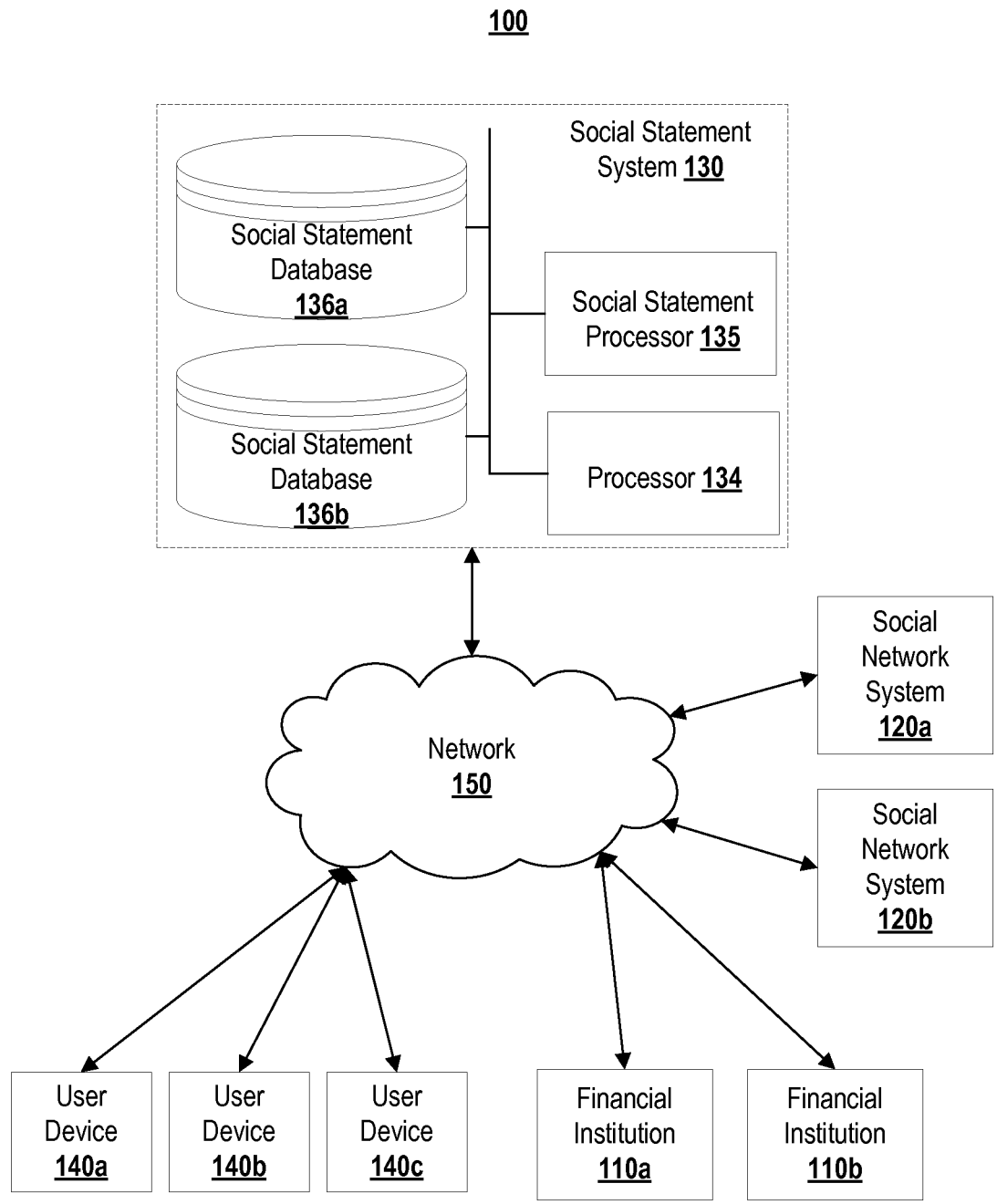
FIG. 1 is a block diagram illustrating an example system for providing social statements to an account holder at a financial institution, consistent with disclosed embodiments.

The following description is intended to convey a thorough understanding of the embodiments described by providing a number of specific example embodiments and details involving systems and methods for providing social statements for an account holder having an account at a financial institution. It should be appreciated, however, that the present disclosure is not limited to these specific embodiments and details, which are example only. It is further understood that one possessing ordinary skill in the art, in light of known systems and methods, would appreciate the use of the invention for its intended purposes and benefits in any number of alternative embodiments, depending on specific design and other needs. A financial institution and system supporting a financial institution are used as examples for the disclosure. The disclosure is not intended to be limited to financial institutions and the like.

The embodiments disclosed herein are directed to systems and methods for providing a social statement to an account holder. According to the various embodiments of the present disclosure, a social statement provider may receive account holder financial data over a network. The social statement provider may be, for example, a financial institution, a social networking site, or a third-party provider. The account holder financial data may be associated with an account with the financial institution held by an account holder. The account holder financial data may include data relating to purchases made by the account holder with a certain merchant using a card associated with the account and/or data relating to other financial transactions performed by the account holder. The social statement provider may further receive account holder social data over a network. The account holder social data may be data provided by one or more social networking sites. The account holder social data may be information associated with one or more profiles created by the account holder at the one or more social networking sites. For example, the account holder social data may include a list of the account holder's friends, interests, or geographic location that the account holder has previously provided to one or more social networking sites. Examples of social networking sites include, without limitation, Facebook, MySpace, Google+, LinkedIn, Twitter, Pinterest, etc. For example, the account holder social data may include a list of all the account holder's "friends" on Facebook, along with a list of all the account holder's professional contacts from LinkedIn. In another non-limiting example, the account holder social data may include a list of all the account holder's "followers" from Twitter, along with a list of the account holder's interests from Pinterest. The account holder social data may include any combination of information obtained from one or more profiles of the account holder at one or more social networking sites.

The social statement provider may associate, via a computer processor, account holder financial data with account holder social data for a given account holder. The social statement provider may determine, by accessing account holder social data, who the account holder's "friends" or "connections" are within the social network. The social statement provider may then create a social statement for the account holder based at least in part on the account holder financial data and the account holder social data. The social statement provider may then provide the social statement to the account holder.

The social statement may be based at least in part on the account holder financial data, the account holder social data, and on peer financial data associated with an account holder's peer group. The peer financial data may be aggregated financial data of members of the account holder's peer group. The peer financial data may be received from one or more financial institutions. The peer financial data may be anonymized. The peer financial data may be averaged. The peer group may comprise one or more other members of the one or more social networking sites. The peer group may be determined based on one or more factors that are common to the account holder and the one or more other members. The one or more factors may include interests, social connections, location, or the like.

The social statement may include information comparing financial transactions of the account holder with financial transactions of the peer group in various spending categories. The social statement may include information comparing financial transactions of the account holder at a vendor with financial transactions of the peer group at the same vendor. The social statement may include information showing a vendor's popularity with the peer group. The social statement may compare the account holder's account balance with the average account balance of the peer group. The social statement may compare the account holder's monthly payment with the average monthly payment of the peer group. The social statement may include the results of these example comparisons.

FIG. 1 is a block diagram of an example system 100 arranged to provide social statements for an account holder, consistent with disclosed embodiments. It should be readily apparent to one of ordinary skill in the art that the example computing system depicted in FIG. 1 represents a generalized schematic illustration and that other components/devices can be added, removed, and/or modified. As shown in FIG. 1, system 100 can include one or more financial institutions 110 (e.g., financial institution 110a, financial institution 110b, etc.), one or more social network systems 120 (e.g., social network system 120a, social network system 120b, social network system 120c, etc.), social statement system 130, one or more user devices 140 (e.g., user device 140a, user device 140b, user device 140c, etc.), and network 150.

System 100 may include one or more financial institutions 110. The one or more financial institutions 110 may be any type of financial institution including, by way of example and not limitations, depository institutions (e.g., banks, credit unions, building societies, trust companies, mortgage loan companies, pre-paid gift cards or credit cards, etc.), contractual institutions (e.g., insurance companies, pension funds, mutual funds, etc.), investment institutions (e.g., investment banks, underwriters, brokerage funds, etc.), and other non-bank financial institutions (e.g., pawn shops or brokers, cashier's check issuers, insurance firms, check-cashing locations, payday lending, currency exchanges, microloan organizations, crowd-funding organizations, third-party payment processors, etc.). In one example embodiment, financial institutions 110 may perform financial transactions (e.g., process transactions by a third-party payment processor, etc.) or enable the performance of financial transactions (e.g., issue cards or other financial accounts) on behalf of one or more end users.

In various example embodiments, each financial institution 110 may have a plurality of account holders. In some embodiments, an account holder may be any individual or entity that desires to conduct a financial transaction using one or more accounts held at one or more financial institutions 110. An account holder also may be a computer system associated with or operated by such an individual or entity. An account may include any place, location, object, entity, or other mechanism for holding money or performing transactions in any form, including, without limitation, electronic form. For example, an account may be a credit card account, a prepaid card account, stored value card account, debit card account, check card account, payroll card account, gift card account, prepaid credit card account, charge card account, checking account, rewards account, line of credit account, credit account, mobile device account, or mobile commerce account. An account may or may not have an associated card, such as, for example, a credit card for a credit account or a debit card for a debit account. The account card may be associated or affiliated with one or more social networking sites, such as a co-branded credit card.

System 100 may further include one or more social network systems 120. Social network systems 120 may be any type of service or platform upon which a user can build social networks or social relationships with others who may share, for example, interests or hobbies, activities or career fields, backgrounds, or real-life connections. Social network systems 120 may, for example, allow users to share pictures, posts, ideas, activities, events, and notifications with others in the same social network system 120. A social network system 120 may consist of a representation of each user (often referred to as a "profile"), the user's social links, and other services related to the particular type of social network system 120. In various embodiments, social network systems 120 are web-based (e.g., accessible via a network such as the Internet), and provide means for users to interact with one another (e.g., text, chat, instant messaging, video calls, emails, etc.). Examples of social networking sites may include, for example and without limitation, Facebook, MySpace, Google+, LinkedIn, Twitter, Pinterest, FourSquare, Yelp, Geni.com, HR.com, Listogrophy, Raptr, Yammer, etc.

System 100 may also include social statement system 130. Social statement system 130 may be configured to receive a user's financial institution data, receive the user's social network system data, associate the user's financial institution data and social networking data with each other, and create a social statement for the user. Social statement system 130 may include one or more processors 134, one or more social statement processor 134, and one or more social statement databases 136 (e.g., social statement database 136a, social statement database 136b, etc.). One or more processors 134 may be configured to associate an account holder's account holder financial data with the account holder's account holder social data, and one or more social statement processors 135 may be configured to create a social statement for the account holder. While FIG. 1 illustrates processor 134 as distinct from social statement processor 135, it is envisioned that processors 134 may be configured to perform one or more of the processes disclosed as performed by social statement processors 135 and social statement processors 135 may be configured to perform one or more of the processes disclosed as performed by processors 134.

Social statement system 130 may store information in various electronic storage media, such as, for example, database 136. Electronic information, files, and documents may be stored in various ways, including, for example, a flat file, indexed file, hierarchical database, relational database, such as a database created and maintained with software from, for example, Oracle® Corporation, Microsoft® Excel file, Microsoft® Access file, or any other storage mechanism.

As described in reference to FIG. 1, social statement system 130 may be configured to receive account holder financial data. Account holder financial data may be received at processor 134 from one or more financial institutions 110 via network 150. The account holder financial data may be associated with a specific account held by an account holder at a financial institution 110. The account holder financial data may include any financial data that may appear on a traditional balance statement. The account holder financial data also may include one or more of an account balance, a total number of purchases made by the account holder over a period of time using the account, a total dollar amount of purchases made by the account holder at a specific merchant or vendor, a total dollar amount of purchases made by the account holder in a certain spending category (i.e., groceries, gasoline, clothing, electronics, entertainment, utilities, etc.). The received account holder financial data may be stored in a database, such as, for example, databases 136.

In addition, social statement system 130 may be configured to receive account holder social data. Account holder social data may be received at social statement processor 135 from one or more social network systems 120 via network 150. The account holder social data may be associated with one or more social network system user profiles associated with the account holder. The account holder social data may include, without limitation, information about the account holder's friends or associates, the account holder's gender, age, relationship status, family members, interests, hobbies, social groups that the account holder is a member of, entertainment preferences, political views, religious beliefs, favorite sports teams, and geographic location. The account holder social data also may include a user id and password corresponding to the account holder that allows the account holder to access the account holder's own profile at social network system 120.

Processor 134 may be further configured to associate account holder financial data with account holder social data. The association process may be accomplished by comparing an identifier corresponding to the account holder financial data with an identifier corresponding to the account holder social data. The identifier may be, for example, the account holder's first and/or last name, an identification number, an email or physical address, etc. In embodiments, processor 134 may require the account holder to provide the user id and password corresponding to the account holder that allows the account holder to access their profile at social network system 120. Processor 134 may compare the provided user id and password with the social network user id and password included in the account holder social data. If the information matches, processor 134 may store the account holder's account holder social data and account holder financial data in one or more social statement databases 136. Processor 134 may generate an account holder identifier based on the account holder social data and account holder financial data. The account holder identifier may be stored with the account holder social data and account holder financial data in one or more social statement databases 136.

Social statement processor 135 may be configured to create a social statement for the account holder. Social statement processor 105 may create a social statement based at least in part on the account holder financial data and account holder social data stored in database 106 and peer financial data associated with a peer group. The peer financial data may be obtained from one or more financial institutions 110. The peer financial data also may be stored in social statement databases 136. It is anticipated that the peer group and/or the peer financial data may be anonymized to remove personally identifying information. In various embodiments, social statement processor 135 may anonymize the peer financial data. Additionally and/or alternatively, the peer financial data received by the social statement processor 136 may be anonymized by the one or more financial institutions 110 that provide the peer financial data. Social statement processor 135 may average the peer financial data.

The peer group may include one or more other users from one or more social network systems 120. Social statement processor 135 may determine the peer group based on one or more factors, such as, for example, geographic region (e.g., city, county, state, etc.), common interests (e.g., entertainment, hobbies, religion, political views, foods, music, etc.), accounts with a same financial institutions 110, age, gender, income level, relationship status, employer, shared social connections (e.g., friendships, family relationships, employers, etc.), birth date or birth year, etc. The factors may be pre-programmed and stored in social statement databases 136 and/or social statement system 130 may allow the account holder to select the factors and store the selected factors in social statement database 136.

The social statement may include information comparing account holder financial data of an account holder with peer financial data from the peer group. The peer financial data may be based at least in part on financial data received in the same manner that social statement system 102 received the account holder financial data of the account holder. The social statement may include information comparing an account holder's purchases in various spend categories against purchases made by the peer group in the same spend categories. The spend categories may be predetermined and stored in social system database 136. The spend categories may also be created by the account holder. The social statement may include information comparing an account holder's purchases made at a certain vendor with purchases made by an account holder's peer group at the same vendor. The social statement may include information recommending the account holder contact one of the one or more other users from the peer group, based on whether the other user made purchases exceeding a pre-determined amount at a specific vendor. The social statement may include information comparing an account holder's spending over a set time period with spending by the peer group over the same time period. The social statement may include information comparing optional account features selected by the account holder with the most common account features selected by the peer group. The social statement may include information promoting a vendor that is popular with the peer group in a certain spend category.

The social statement system 130 may provide a location-based alert to the account holder. Social statement system 130 may receive the account holder's current location based on a current location of the account holder's user device 140. For example, a user device 140 may be equipped with location-tracking systems and methods, such as GPS, and the user device 140 may transmit the current location of the user device 140 to social statement system 130. Social statement processor 135 may compare the account holder's current location with the location of a vendor that has been identified as popular with the peer group in the account holder's social statement.

If the social statement processor 135 determines that the current location of the account holder is within a set distance of the location of the popular vendor, social statement system 130 may send a notification to the account holder. The notification may be an electronic notification to the account holder's user device 140 via network 150. The notification may be, for example, a text message, email, SMS, or other form of electronic communication. Social statement system 130 may include information about the popular vendor in the notification.

The set distance (or proximity) may have been previously programmed into the social statement processor 135. Social statement system 130 may be configured to allow an account holder to input the set distance him or herself. For example, the account holder may designate a set distance of 1 mile. Accordingly, social statement system 130 would only transmit a notification to account holder if his current location is within 1 mile of the location of a popular vendor. Social statement system 130 may be configured to allow account holder to designate a type of vendor in a certain category. Thus, for example, if the account holder designates vendors in the category of "restaurants" and a proximity of 1 mile, social statement system 130 may transmit a notification to account holder if his current location is within one mile of a popular restaurant.

System 100 may include one or more user devices 140. User devices 140 may be any computer device, or communications device including, e.g., a server, a network appliance, a personal computer (PC), a workstation, a mobile device, a phone, a handheld PC, a personal digital assistant (PDA), a thin client, a fat client, an Internet browser, or other device. A non-limiting example of a mobile device includes a smartphone (e.g., iPhone, Android-enabled phone, etc.), a tablet computer (e.g., iPad, Kindle Fire, Playbook, Touchpad, etc.). User devices 140 may be used to access financial institutions 110, social statement system 120, and/or social network systems 130 via network 140. In addition, social statements may be displayed on user devices 140 when a user device 140 accesses a website hosted by the financial institution. Social statements also may be displayed on user devices 140 when a user device 140 accesses a website hosted by a social networking site. Further, social statements may be displayed on user devices 140 when a user device 140 accesses a third-party website or when a user device 140 accesses the account holder's social networking profile page. Accessing a website may consist of, for example, providing a uniform resource locator (URL) to a web browser, which will then request the web page associated with the URL and display the requested web page on a display of the user device 140. The information in the social statement may be displayed in text-based form. The information may be displayed graphically, or as an animation, or as a combination of the aforementioned examples. The account holder may view the social statement by accessing a password protected account with the social networking site. The account holder may view the social statement by accessing a password protected account with the financial institution, or with some other third-party.

Financial institutions 110, social statement system 120, social network systems, and user devices 140 may be configured to communicate via a network, such as, for example, network 150. Network 150 may be any combination of a wireless network and/or wired network. For example, network 150 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11b, 802.15.1, 802.11n and 802.11g or any other wired or wireless network for transmitting and receiving a data signal.

In addition, network 150 may include, without limitation, telephone lines, fiber optics, IEEE Ethernet 902.3, a wide area network ("WAN"), a local area network ("LAN"), or a global network such as the Internet. Also network 150 may support an Internet network, a wireless communication network, a cellular network, or the like, or any combination thereof. Network 150 may further include one network, or any number of the example types of networks mentioned above, operating as a stand-alone network or in cooperation with each other. Network 150 may utilize one or more protocols of one or more network elements to which they are communicatively coupled. Network 150 may translate to or from other protocols to one or more protocols of network devices. Although network 150 is depicted as a single network, it should be appreciated that according to one or more embodiments, network 150 may comprise a plurality of interconnected networks, such as, for example, the Internet, a service provider's network, a cable television network, corporate networks, and home networks.

It should be appreciated that the foregoing discussion related to FIG. 1 is illustrative only, and that the various embodiments of the invention may be implemented by any other appropriate system or method. For example, in the embodiment shown in FIG. 1, social statement system 130 is disclosed as a separate component from financial institutions 110 and social network systems 120. The embodiments also may disclose social statement system 130 as being integrated into financial institution 110. The embodiments also may disclose social statement system 130 as being integrated into social network systems 120. As referred to herein, a network-enabled computer system and/or device may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The network-enabled computer systems may execute one or more software applications to, for example, receive data as input from an entity accessing the network-enabled computer system, process received data, transmit data over a network, and receive data over a network. The one or more network-enabled computer systems may also include one or more software applications to enable the creation of a social statement, as described herein.

FIGS. 2 through 6 each illustrate various exemplary features of an account holder's social statement, as created by social statement system 130 and provided to a user via one or more user devices 140. In embodiments illustrated by FIGS. 2 through 6, the social statement may be provided via a web site associated with social network system 120. For example, the social statement may be displayed to the account holder as part of the account holder's secure profile on a social network system 120. The social statement also may be provided to a user via a web site hosted by one or more financial institutions 110. Additionally or alternatively, the social statement may be provided to a user by a web site hosted by a third-party. While the examples of FIGS. 2 through 6 illustrate a single financial account at a single financial institution 110, it is envisioned that the disclosed systems and methods can display multiple accounts at a single financial institution 110 and/or multiple accounts at multiple financial institutions 110.

Figure 2:
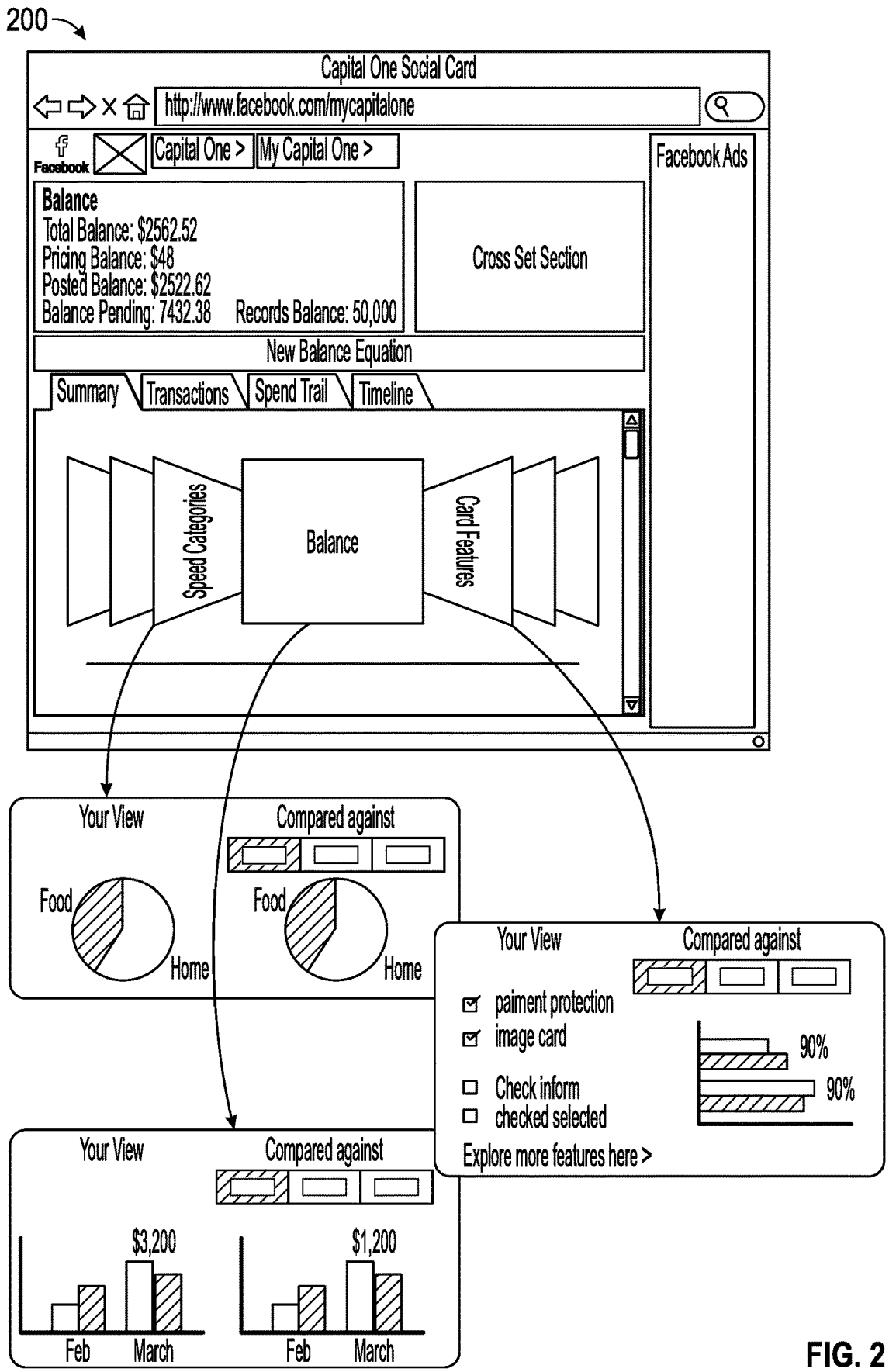
FIG. 2 is an example screenshot of a summary page of an account holder's social statement, consistent with disclosed embodiments.

FIG. 2 depicts an example screenshot 200 of a "summary" page of an account holder's social statement. In the example of FIG. 2, the social statement may display a balance associated with the account holder's account at the financial institution 110. The social statement summary page may also display a "spend categories section." The spend categories section may display an account holder's spending by category as a bar graph or a pie chart and compare it to the average spending of a peer group based in the same spend category. In this embodiment, the social statement allows the user to change the peer group based on one or more factors. For example, the account holder may change the peer group by selecting or changing a city (e.g., "McLean"), a social connection (e.g., "friends"), interests, etc.

Figure 3:
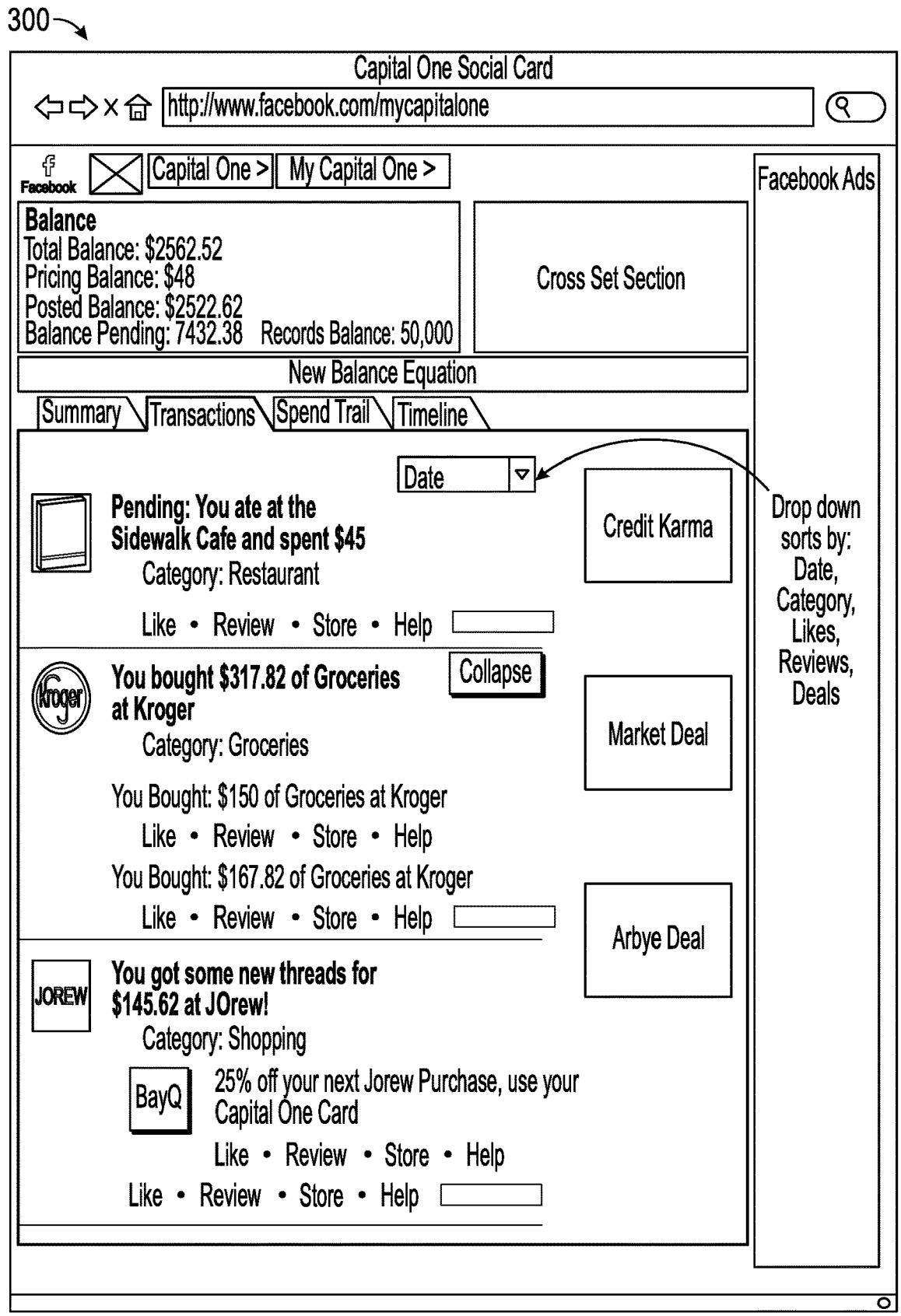
FIG. 3 is an example screenshot of a transactions page of an account holder's social statement, consistent with disclosed embodiments.

FIG. 3 depicts an example screenshot 300 of a "transactions" page of an account holder's social statement. In the example of FIG. 3, the transactions page may list recent purchases made by the account holder. In some embodiments, the transactions page may categorize the purchases by the type of item purchased (e.g., groceries, clothing, restaurant). Further, the transactions page may list other financial transactions made by the account holder and/or display the name of the merchant or vendor associated with a given purchase. Still further, the transactions page may sort the purchases by date, dollar amount, merchant or vendor, category, etc. Additionally, the transactions page may allow the account holder to "share" information about a specific transaction with other users in his or her social network.

Figure 4:
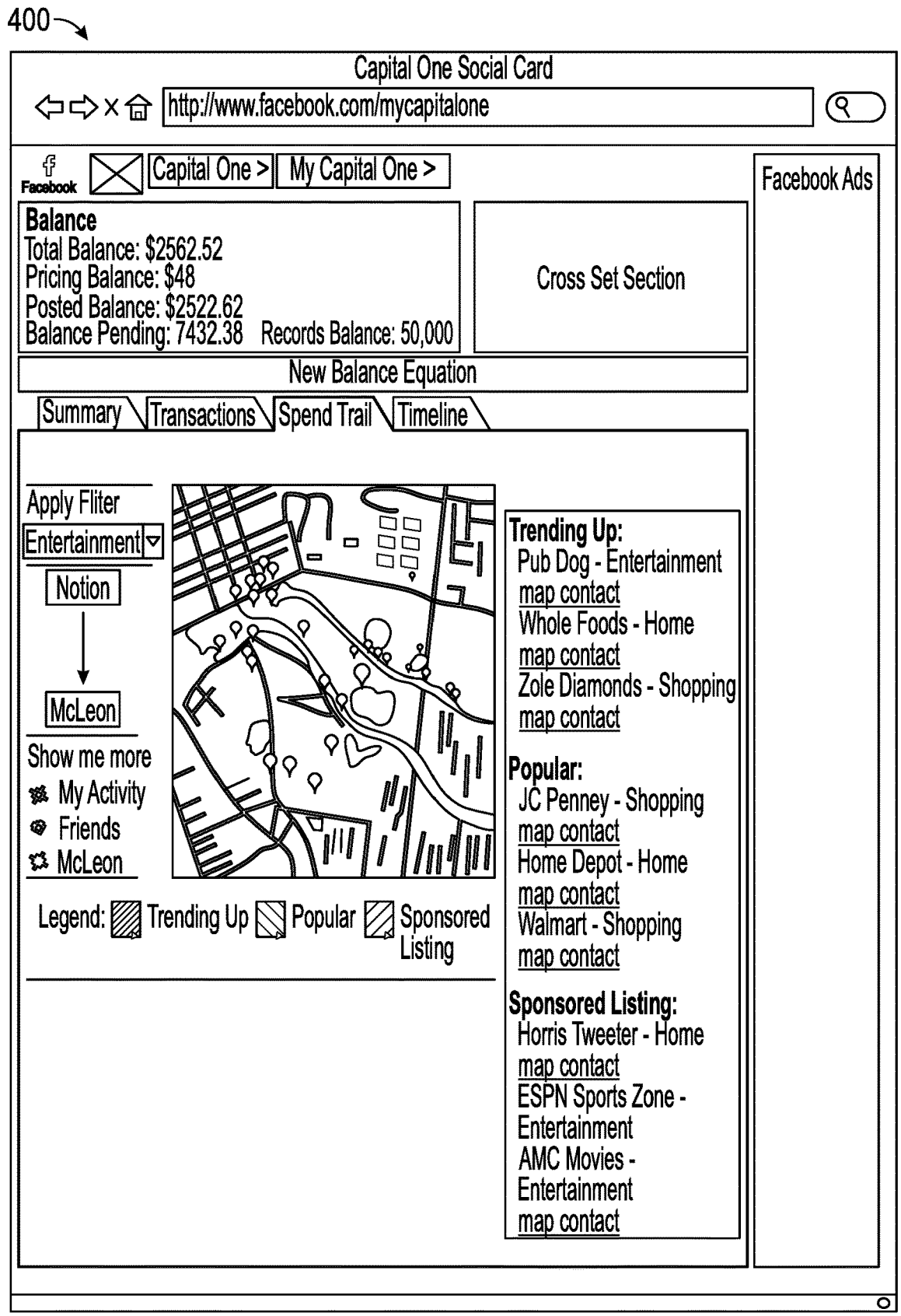
FIG. 4 is an example screenshot of a spend trail page of an account holder's social statement, consistent with disclosed embodiments.

FIG. 4 depicts an example screenshot 400 of "spend trail" page of an account holder's social statement. The spend trail page may display an interactive map that shows vendors that are trending up, popular, or sponsored. Systems and methods for providing a user near a point of sale location with notifications of available rewards at a point of sale location are disclosed in, for example, U.S. Pat. No. 7,934,639 to Chen et al., which is incorporated herein by reference. A vendor may be listed as trending up based on the increase in frequency of transactions associated with that vendor over a specified period of time, made by the account holder's peer group. The social statement spend trail page may only list vendors where the account holder has made a purchase in the last several months. The spend trail page may also display vendors that sell similar goods or services to those sold by a vendor that the account holder has recently purchased from. The spend trail page may display transactions by a peer group at given locations or given vendors. The location or vendor may be specified by the account holder. The location or vendor may be based on the account holder's account holder financial data and/or account holder social data. The transactions page may filter the transactions based on a spend category. In this way, the transactions page may provide an account holder with information showing, for example, which local vendors are trending up with the account holder's peer group, or which local vendors are most popular with the account holder's peer group.

Figure 5:
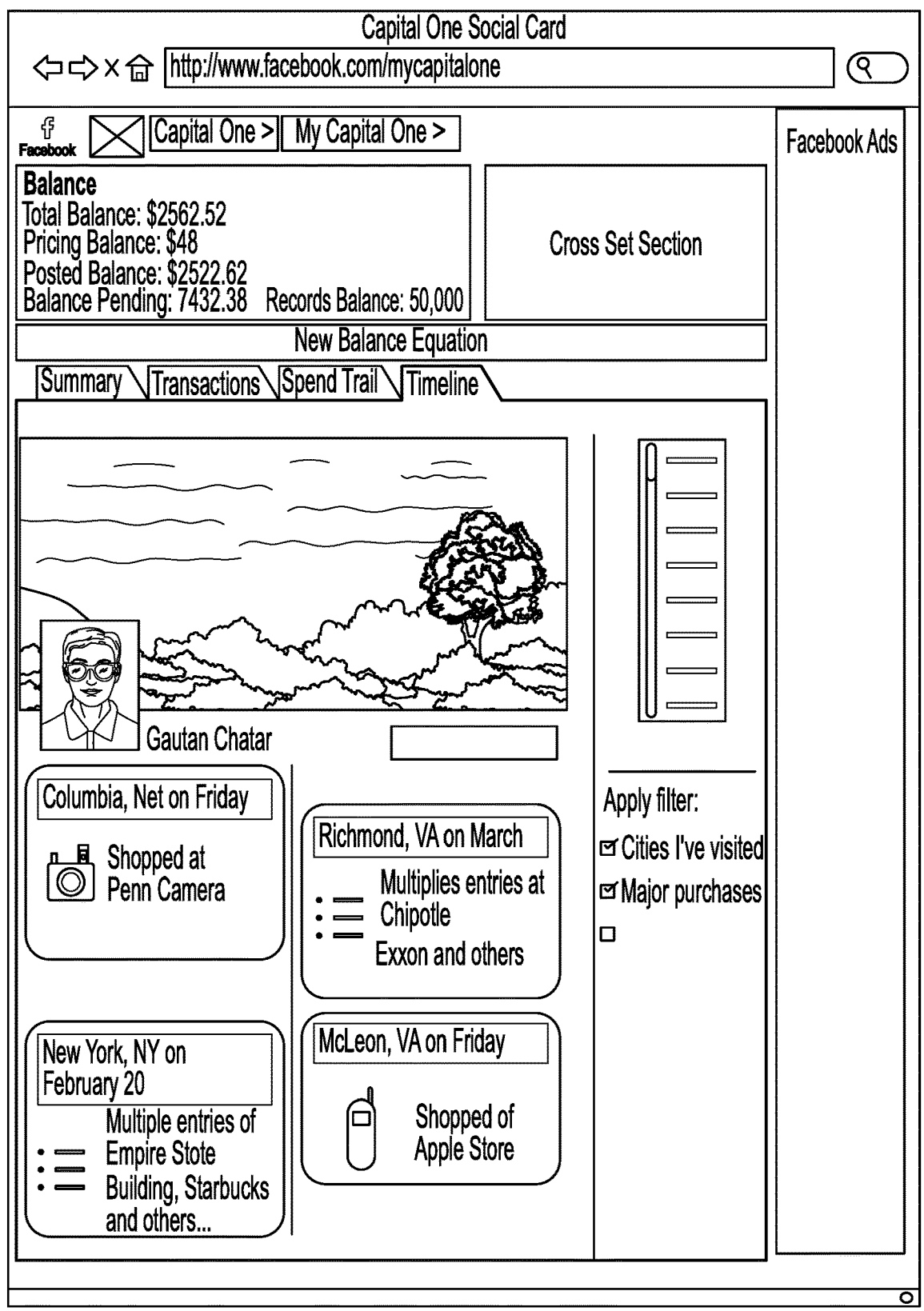
FIG. 5 is an example screenshot of a timeline page of an account holder's social statement, consistent with disclosed embodiments.

FIG. 5 depicts an example screenshot 500 of a "timeline" page of an account holder's social statement. The timeline page may display all the transactions of the account holder in a "timeline" setting that is only shown to the account holder. The account holder may allow other users in his or her social network to view the timeline page.

Figure 6:
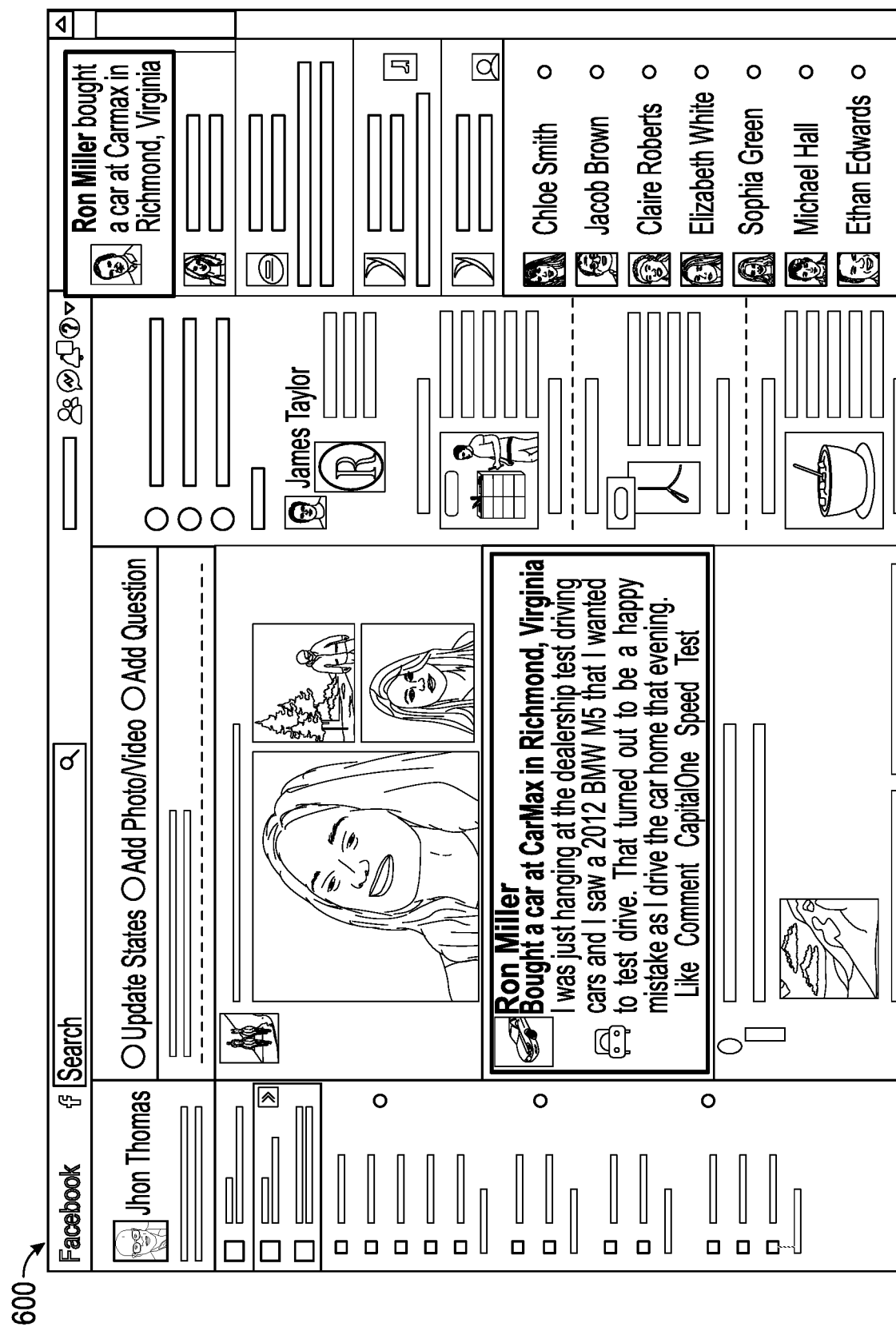
FIG. 6 is an example screenshot of a newsfeed page of an account holder's social statement, consistent with certain disclosed embodiments.

FIG. 6 depicts an example screenshot 600 of a "newsfeed" of an account holder's social statement. As illustrated in FIG. 6, the social statement may be displayed as a newsfeed on an account holder's social networking page. The newsfeed would be displayed to any other user of the social networking site who had been granted access to the account holder's profile on the social networking site. The social statement newsfeed may display, for example, the name of the account holder, a verb describing the account holder's activity, the name of a vendor associated with a transaction made by the account holder, the time of the transaction, the location of the vendor, and the spend category to which the vendor belongs.

Figure 7:
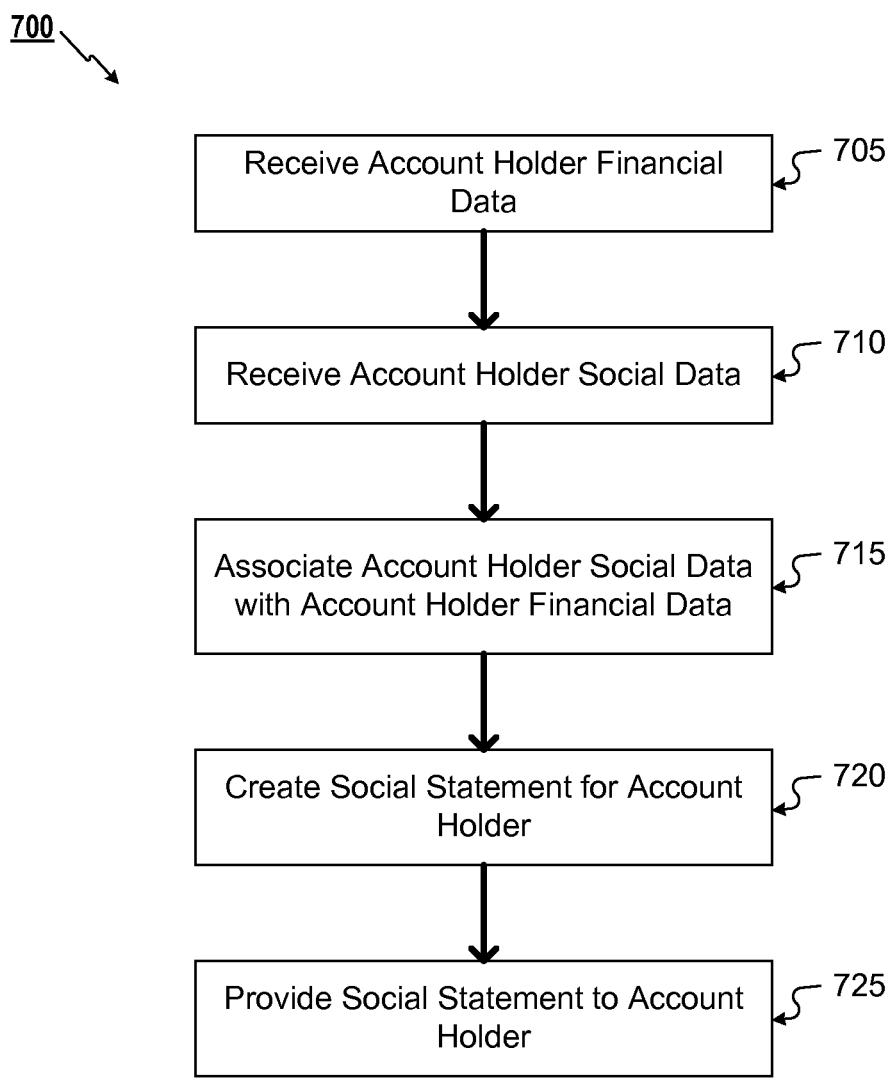
FIG. 7 is a flow chart illustrating an example method for providing an account holder's social statement, consistent with disclosed embodiments.

FIG. 7 is a flow chart 700 illustrating a method for providing a social statement to an account holder at a financial institution. The method illustrated by flow chart 700 in FIG. 7 can be executed or otherwise performed by one or more combinations of various systems, such as, for example, financial institutions 110, social network systems 120, and/or social statement system 130. Each block shown in FIG. 7 represents one or more processes, methods, or subroutines in the example method 700.

In FIG. 7, social statement system 130 may receive account holder financial data (705), the account holder financial data being associated with an account holder at a financial institution. The account holder financial data may be received from a financial institution, such as one or more of financial institutions 110. Social statement system 130 may further receive account holder social data (710), the account holder social data being received from one or more social network sites where the account holder has a user profile, such as, for example, social network systems 120.

Social statement system may associate the account holder social data with the account holder financial data (715) and store the association in one or more social statement databases 136, along with the account holder social data with the account holder financial data. Associating the account holder social data with the account holder financial data may be accomplished by, for example, comparing a common identifier associated with both the account holder financial data and the account holder social data. The common identifier may be, for example, all or a portion of the account holder's name, an identification number, a preselected anonymous identifier, etc. Additionally, the account holder social data may include a social network user id and password. For example, the processor 134 may require the account holder to provide a user id and password. Processor 134 may compare the provided user id and password with the social network user id and password. If the information does not match, processor 134 may stop the process and require the account holder to provide a different user id and password. If the information matches, processor 134 may store the account holder's account holder social data and account holder financial data in social statement database 136 with an account holder identifier. The account holder identifier may be generated by the processor 134 based on the account holder social data and account holder financial data.

Social statement system 130 may create a social statement for the account holder (720). The social statement may be created based at least in part on the account holder's account holder financial data and account holder social data stored in social statement database 136 and peer financial data associated with a peer group. In various embodiments, the social statement may include information comparing an account holder's purchases at a given merchant with the purchases of the peer group at the same merchant, comparing an account holder's purchases in a given category with the purchases of the peer group in the same category, comparing an account holder's total dollar purchases over a period of time with the average total dollar purchases of the peer group over the same period of time, comparing the most frequented merchants of the account holder with the most frequented merchants of the peer group, comparing the account balance of the account holder with an average account balance of the peer group, etc.

Social statement system 130 may provide the social statement to the account holder (725). The social statement may be provided via a graphical user interface operating on a user device, such as user device 140. For example, the social statement may be provided as a series of pages that an account holder can access on a website. In various embodiments, the social statement may be displayed on one or more of website hosted by the financial institution, a website hosted by a social networking site, or a third-party website. The social statement also may be accessible via the account holder's social networking profile page. In such embodiments, the social networking profile page may be a secure, password-protected profile.

Figure 8:
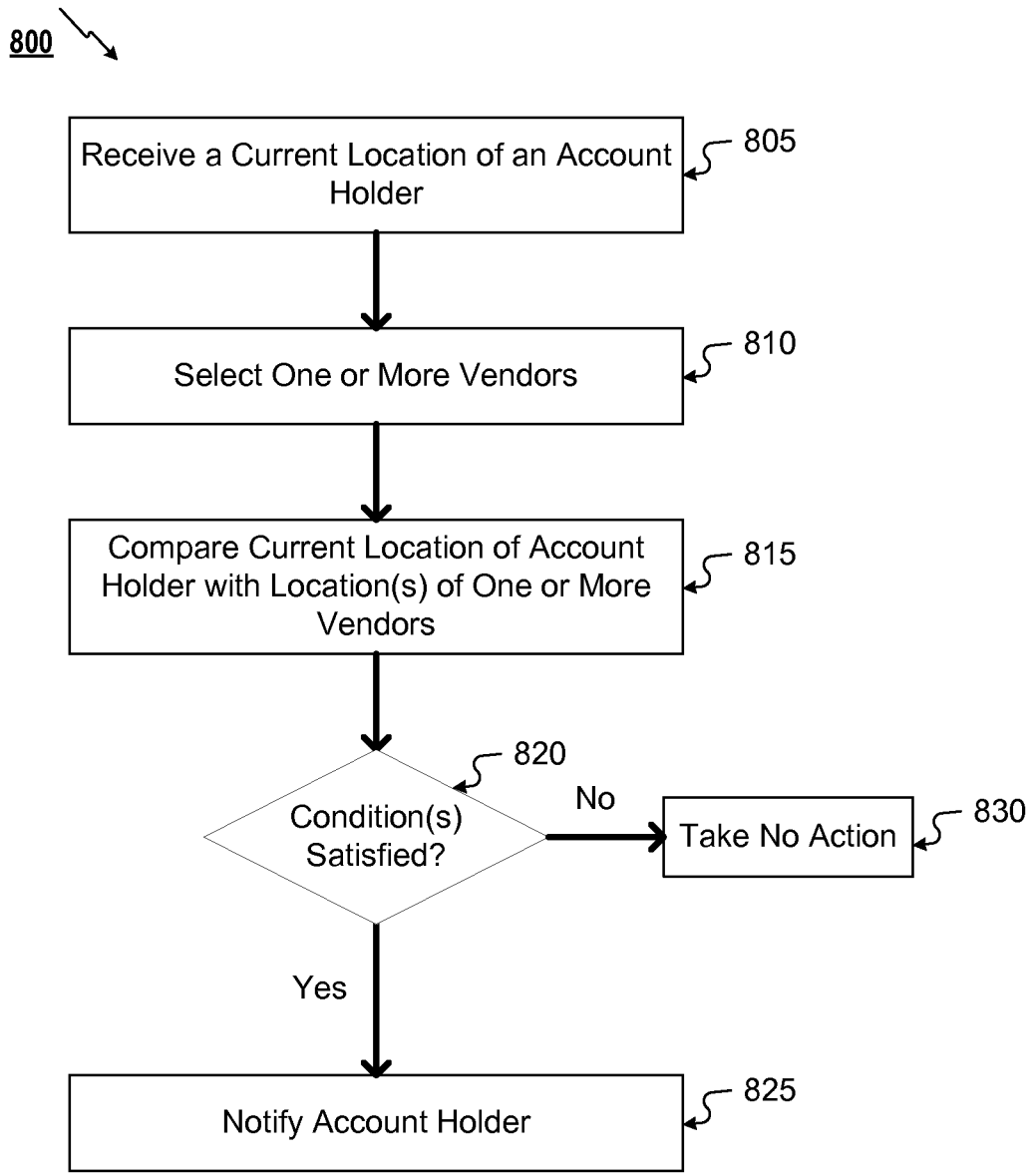
FIG. 8 is a flow chart illustrating an example method for notifying an account holder of a popular vendor based on a location, consistent with disclosed embodiments.

FIG. 8 is a flow chart 800 illustrating a method for notifying an account holder of a popular vendor based on the account holder's current location. The method illustrated by flow chart 800 in FIG. 8 can be executed or otherwise performed by one or more combinations of various systems, such as, for example, financial institutions 110, social network systems 120, and/or social statement system 130. Each block shown in FIG. 8 represents one or more processes, methods, or subroutines in the example method 800.

Social statement system 130 may receive a current location of an account holder (805). As discussed above, the current location of the account holder may correspond to a current location of the account holder's user device 140. In such embodiments, the user device 140 may be equipped with location-based services, such as GPS. In other embodiments, however, the account holder may provide social statement system 130 with location information, such as a physical address, via a user interface of the user device 140.

Social statement system 130 may select one or more vendors (810). In some embodiments, social statement system 130 may select the one or more vendors based at least in part on the account holder financial data, account holder social data, and peer financial data received by social statement system 130. The one or more vendors may be derived from the social statement created by the social statement system 130. The one or more vendors may be selected based on a popularity determination, i.e., identification of the vendors that are most popular with the account holder's peer group. For example, the one or more vendors may be selected from the vendors listed on the "spend trail" page of the social statement, as shown in FIG. 4. The one or more vendors each may have a location and the location of each vendor may be provided by the social statement as previously described.

Social statement system 130 may compare the location of the one or more vendors with the current location of the account holder (815). Social statement system 130 may compare the locations to determine how far the account holder is from the one or more vendors. Social statement system 130 may apply one or more conditions to the comparison. The one or more conditions may include, for example, a set distance or proximity, a vendor category, etc., as discussed above.

Using the applied conditions, social statement system 130 may determine if the conditions are satisfied (820). If the social statement processor determines that the conditions have been met (820, Yes), social statement system 130 may notify the account holder (825). As discussed above, the notification may be sent electronically, for example, via one or more of an email, text message, SMS message, etc. Additionally, the notification may include vendor information, such as, for example, a vendor address, a phone number, a link to the vendor's website, a description of the vendor, etc. In some examples, the notification may be sent to the account holder's mobile user device 140, such as the account holder's smartphone or tablet device. If the conditions have not been satisfied (820, No), no action is taken (830).

It is further noted that the software described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of storing software, or combinations thereof. Moreover, the figures illustrate various components (e.g., servers, computers, processors, etc.) separately. The functions described as being performed at various components may be performed at other components, and the various components bay be combined or separated. Other modifications also may be made.

In the preceding specification, various preferred embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

What is claimed is:

1. A method comprising:
   receiving, via a first network connection, financial data for an account holder from a financial institution system;
   receiving, via a second network connection, social data for the account holder from a social networking system;
   receiving, via the second network connection, user social data for a plurality of users of the social networking system;
   determining a peer group from the user social data, the peer group having at least one social networking profile factor in common with the account holder;
   identifying, from the financial data, a first group of one or more vendors where the account holder has made a purchase;
   identifying, from the social data, a second group of one or more vendors associated with the account holder on the social networking system;
   receiving, via the first network connection, anonymized financial data for the peer group;
   identifying, from the anonymized financial data, a third group of one or more vendors that are most popular with the peer group;
   determining a current location of the account holder using location-based technologies on an account holder device;
   selecting a fourth group of one or more vendors that are within a predefined proximity of the current location of the account holder based on a comparison between the first group of one or more vendors, the second group of one or more vendors, and the third group of one or more vendors; and
   providing instructions to the account holder device to generate an interactive map on a display of the account holder device including a location-based alert with the fourth group of one or more vendors and a spend trail including a selectable element to filter transactions for the account holder based on a spend category.

2. The method of claim 1, wherein the at least one social networking profile factor includes geographic area, common interests, or shared social connections.

3. The method of claim 1, wherein the at least one social networking profile factor includes family members, sports teams, or hobbies.

4. The method of claim 1, further comprising:
   providing instructions to the account holder device to generate a social statement including a representation of the anonymized financial data.

5. The method of claim 1, wherein the interactive map further includes one or more vendors that are trending, the trending being based, in part, on the anonymized financial data.

6. The method of claim 1, wherein the spend trail comprises a comparison of the first group and the second group to the third group.

7. A social statement system comprising:
   a first network connection;
   a second network connection;
   one or more processors including a social statement processor; and
   memory, comprising one or more social statement databases, and instructions that, when executed, cause the one or more processors to:

receive, via the first network connection, financial data for an account holder from one or more financial institutions;
receive, via the second network connection, social data for the account holder from one or more social network systems;
receive, via the second network connection, user social data for a plurality of users of the one or more social network systems;
determine, from the user social data, a peer group having at least one social networking profile factor in common with the account holder;
receive, via the first network connection, anonymized financial data for the peer group;
identify, from the anonymized financial data, a first group of one or more vendors that are most popular with the peer group;
receive, from an account holder device, a current location of the account holder device;
determine a second group of one or more vendors that are both in the first group and within a predetermined distance of the current location; and
send instructions to the account holder device to cause the account holder device to generate an interactive map on a display of the account holder device including a location-based alert with the second group.

8. The social statement system of claim 7, wherein the instructions, when executed, further cause the one or more processors to:
identify, from the financial data, a third group of one or more vendors where the account holder has made a purchase;
determine a fourth group of one or more vendors based on a comparison of the second group and the third group; and
send instructions to the account holder device to cause the account holder device to update the interactive map to include a location-based alert including the fourth group.

9. The social statement system of claim 7, wherein the instructions, when executed, further cause the one or more processors to:
identify, from the social data, a third group of one or more vendors associated with the account holder from one or more social network systems;
determine a fourth group of one or more vendors based on a comparison of the second group and the third group; and
send instructions to the account holder device to cause the account holder device to update the interactive map to include a location-based alert including the fourth group.

10. The social statement system of claim 7, wherein the interactive map further comprises a spend trail including a selectable element to filter transactions for the account holder based on a spend category.

11. The social statement system of claim 7, wherein the instructions, when executed, further cause the one or more processors to:
determine one or more peer criteria based on the social data; and
identify the peer group based on the one or more peer criteria.

12. The social statement system of claim 11, wherein the one or more peer criteria comprise one or more of age, gender, or relationship status.

13. The social statement system of claim 7, wherein the interactive map further comprises a third group of one or more vendors sponsored by the social statement system.

14. A user device comprising:
a display;
a network connection;
global positioning system (GPS), or cellular-based, location services;
one or more processors; and
memory including instructions that, when executed, cause the one or more processors to:
retrieve, via the network connection, financial data for a user from one or more financial institutions;
retrieve, via the network connection, social data for the user from one or more social network systems;
receive, via the network connection, peer social data for a plurality of users of the one or more social network systems;
determine a peer group of two or more users of the plurality of users, the two or more users having at least one social networking profile factor in common with the user;
determine, using the location services, a current location of the user device;
identify a first group of one or more vendors where the user has made a previous purchase using the financial data;
identify, using anonymized financial data for the peer group, a second group of one or more vendors that are most popular with the peer group;
determine a third group of one or more vendors that are (1) within a predetermined distance of the user device and (2) are in the first group or in the second group; and
generate, on the display, an interactive map including a location-based alert with the third group.

15. The user device of claim 14, wherein determining the peer group includes:
determining one or more peer criteria based on the social data; and
identifying the peer group based on the one or more peer criteria.

16. The user device of claim 15, wherein the one or more peer criteria include one or more of interests, social groups that the user is a member of, or entertainment preferences.

17. The user device of claim 14, wherein the instructions, when executed, further cause the one or more processors to:
generate, on the display, a social statement including a representation of the financial data.

18. The user device of claim 17, wherein the social statement further includes a representation of the anonymized financial data.

19. The user device of claim 14, wherein the third group includes vendors that are in the first group and in the second group.

20. The user device of claim 14, wherein the interactive map further comprises a spend trail including a selectable element to filter transactions for the user based on a spend category, the spend trail including vendors that are trending up, popular, or sponsored.

* * * * *